(12) United States Patent
Ewringmann

(10) Patent No.: US 7,967,317 B2
(45) Date of Patent: Jun. 28, 2011

(54) CHILDREN'S VEHICLE, PARTICULARLY PEDAL VEHICLE

(75) Inventor: Ulrich Ewringmann, Taufkirchen (DE)

(73) Assignee: Franz Schneider GmbH & Co. KG, Neustadt (DE)

( * ) Notice: Subject to any disclaimer, the term of this patent is extended or adjusted under 35 U.S.C. 154(b) by 139 days.

(21) Appl. No.: 12/367,109

(22) Filed: Feb. 6, 2009

(65) Prior Publication Data

US 2009/0203293 A1    Aug. 13, 2009

(30) Foreign Application Priority Data

Feb. 7, 2008   (DE) .................. 10 2008 007 895

(51) Int. Cl.
*B62J 9/00* (2006.01)
*A47L 11/00* (2006.01)
*E01H 1/02* (2006.01)
*A01B 35/18* (2006.01)

(52) U.S. Cl. ........ 280/288.4; 15/48.1; 15/79.1; 172/105
(58) Field of Classification Search ............... 280/288.4; 172/105; 15/48.1, 79.1
See application file for complete search history.

(56) References Cited

U.S. PATENT DOCUMENTS

| | | | | |
|---|---|---|---|---|
| 581,196 | A * | 4/1897 | Conselyea | 15/79.1 |
| 810,547 | A * | 1/1906 | Menzies | 15/83 |
| 1,463,707 | A * | 7/1923 | Koger | 15/374 |
| 2,345,460 | A * | 3/1944 | Coderre | 37/241 |
| 2,703,897 | A * | 3/1955 | Malm | 15/48 |
| 3,197,918 | A * | 8/1965 | Coggeshall | 446/290 |
| 3,233,274 | A * | 2/1966 | Kroll | 15/340.2 |
| 3,354,489 | A * | 11/1967 | Ehrlich | 15/83 |
| 3,862,538 | A * | 1/1975 | Henson | 56/328.1 |
| 3,947,912 | A * | 4/1976 | Michaels | 15/79.1 |
| 4,031,659 | A * | 6/1977 | Keller et al. | 446/427 |
| 4,393,537 | A * | 7/1983 | Reprogle et al. | 15/348 |
| 4,917,648 | A | 4/1990 | Hartje | |
| 5,208,935 | A * | 5/1993 | Jailor et al. | 15/41.1 |
| 2005/0144746 | A1* | 7/2005 | Campos | 15/48.1 |

FOREIGN PATENT DOCUMENTS

| | | |
|---|---|---|
| DE | 873669 | 4/1953 |
| DE | 874261 B | 4/1953 |
| DE | 8102981 U1 | 7/1981 |

* cited by examiner

*Primary Examiner* — Paul N Dickson
*Assistant Examiner* — Daniel Yeagley
(74) *Attorney, Agent, or Firm* — Greer, Burns & Crain, Ltd.

(57) ABSTRACT

The children's vehicle, particularly pedal vehicle, is characterized by a sweeping device which is provided with at least one brush and is detachably connectable to the children's vehicle. For driving the brush roller a driver wheel is arranged that in the operative position of the sweeping device is positioned on the ground.

10 Claims, 14 Drawing Sheets

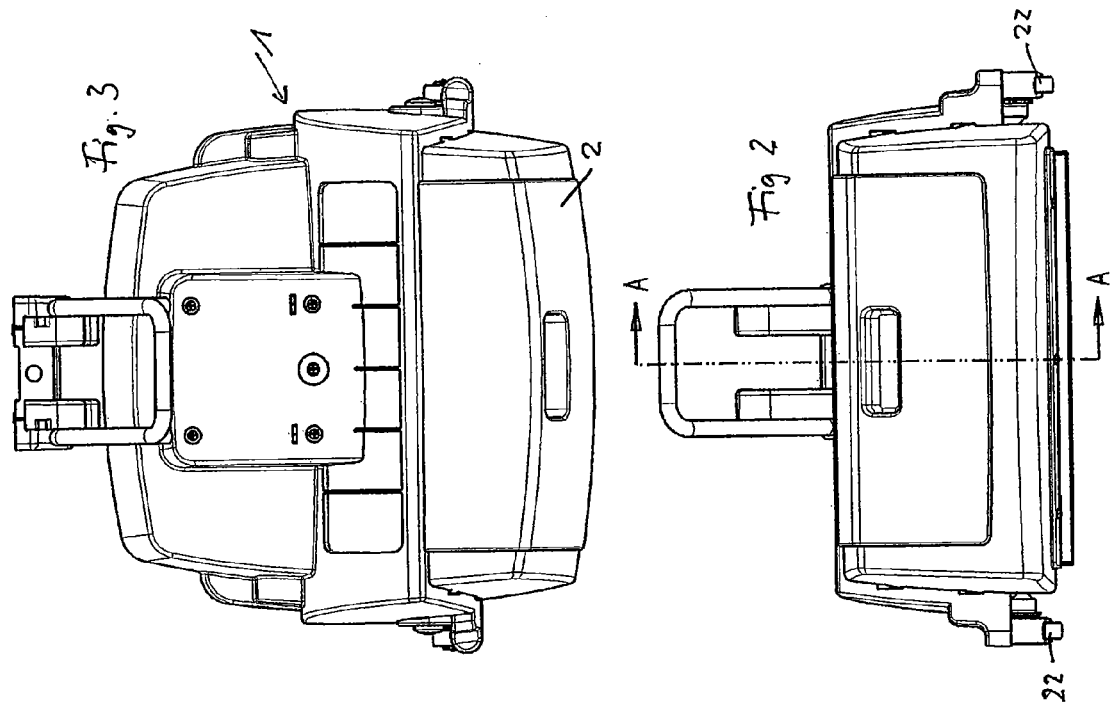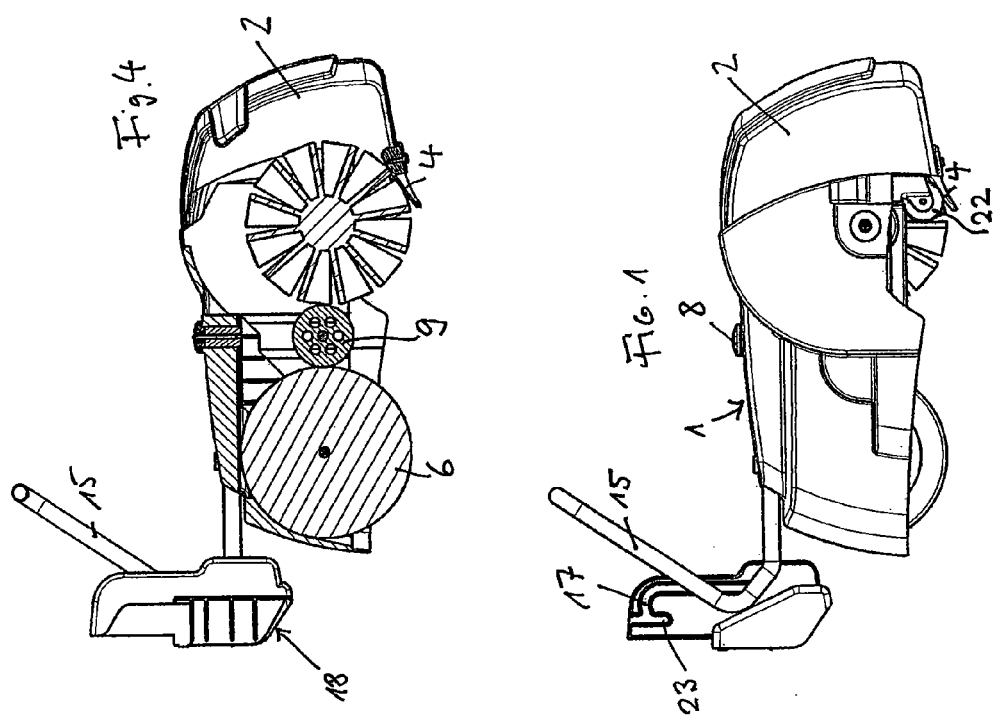

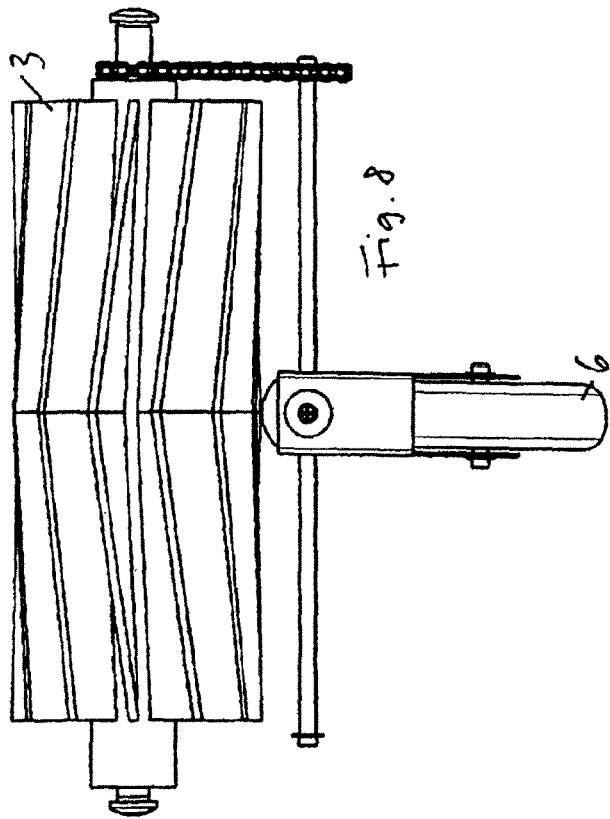
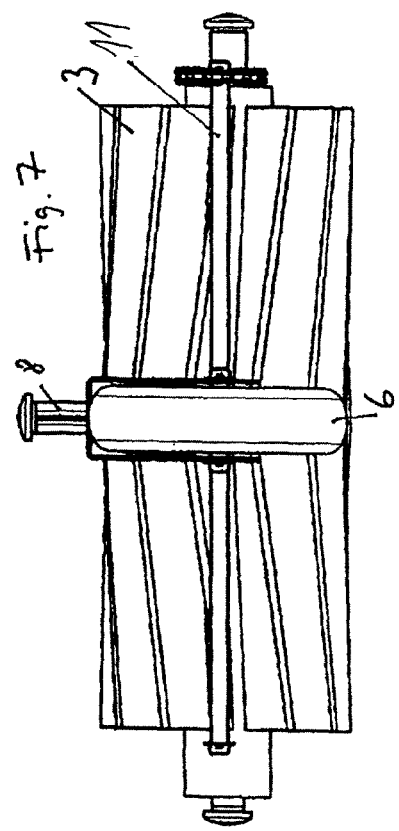
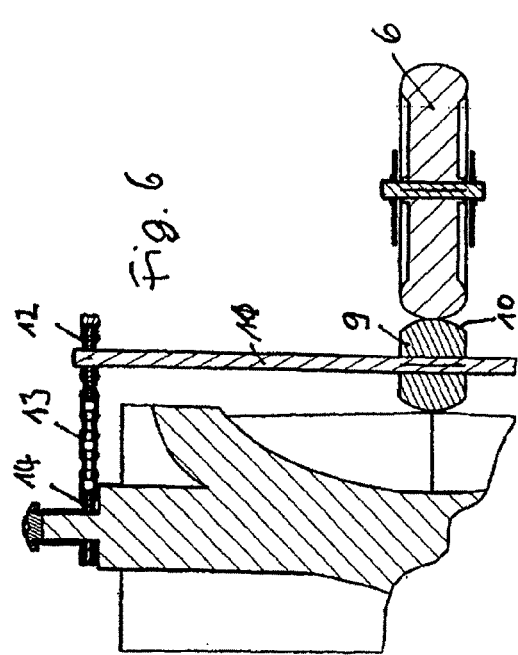
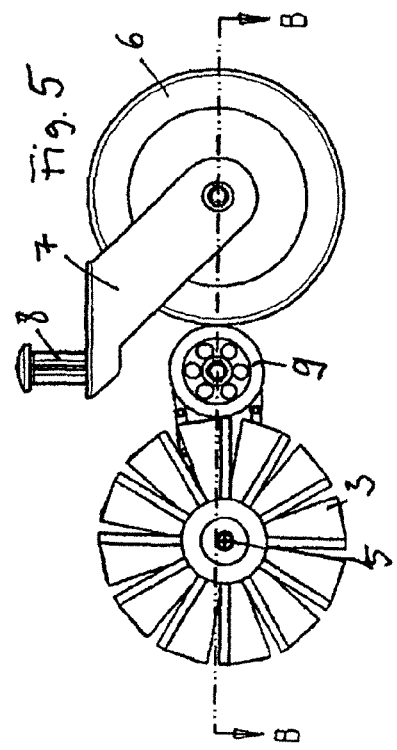

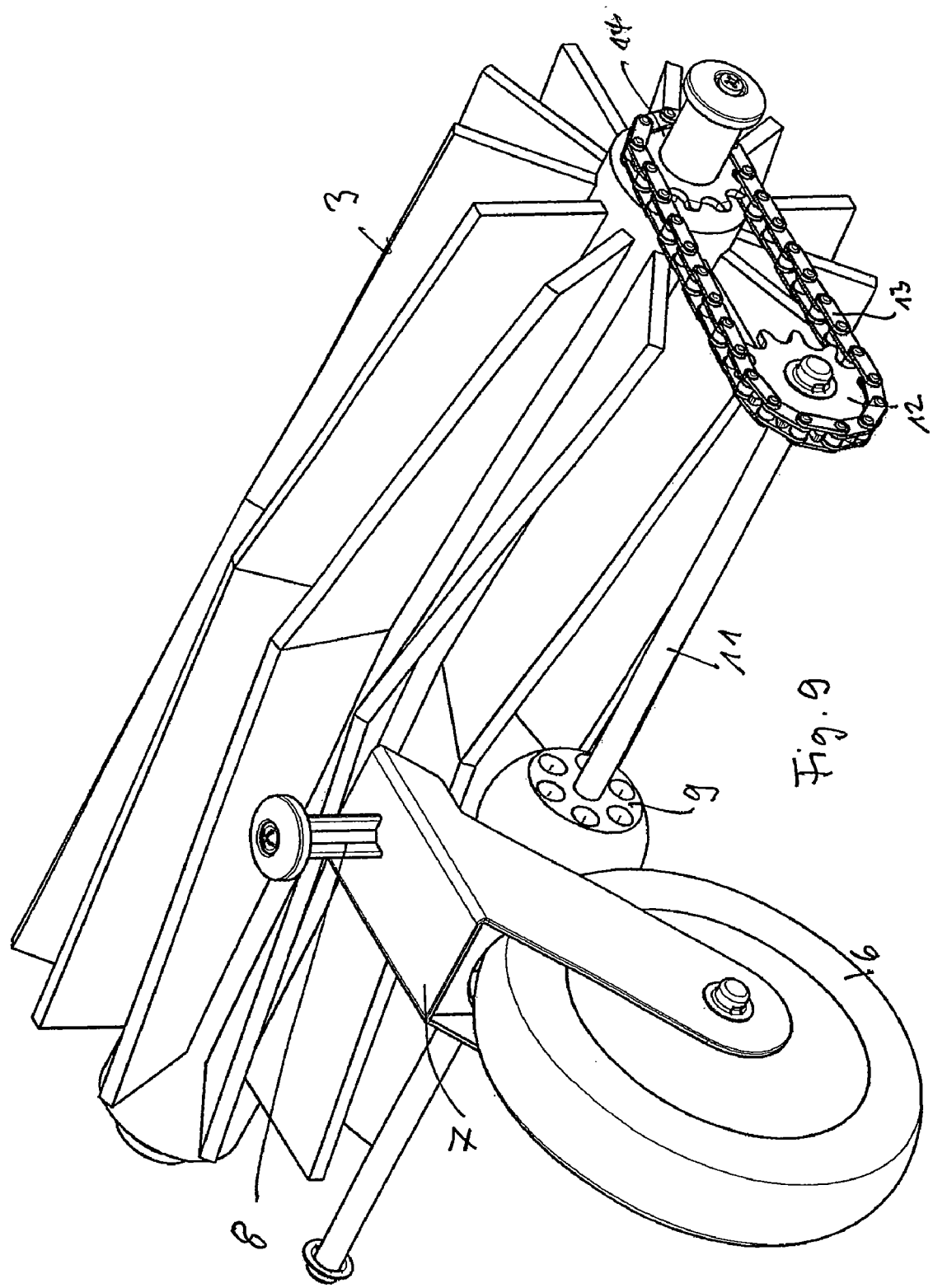

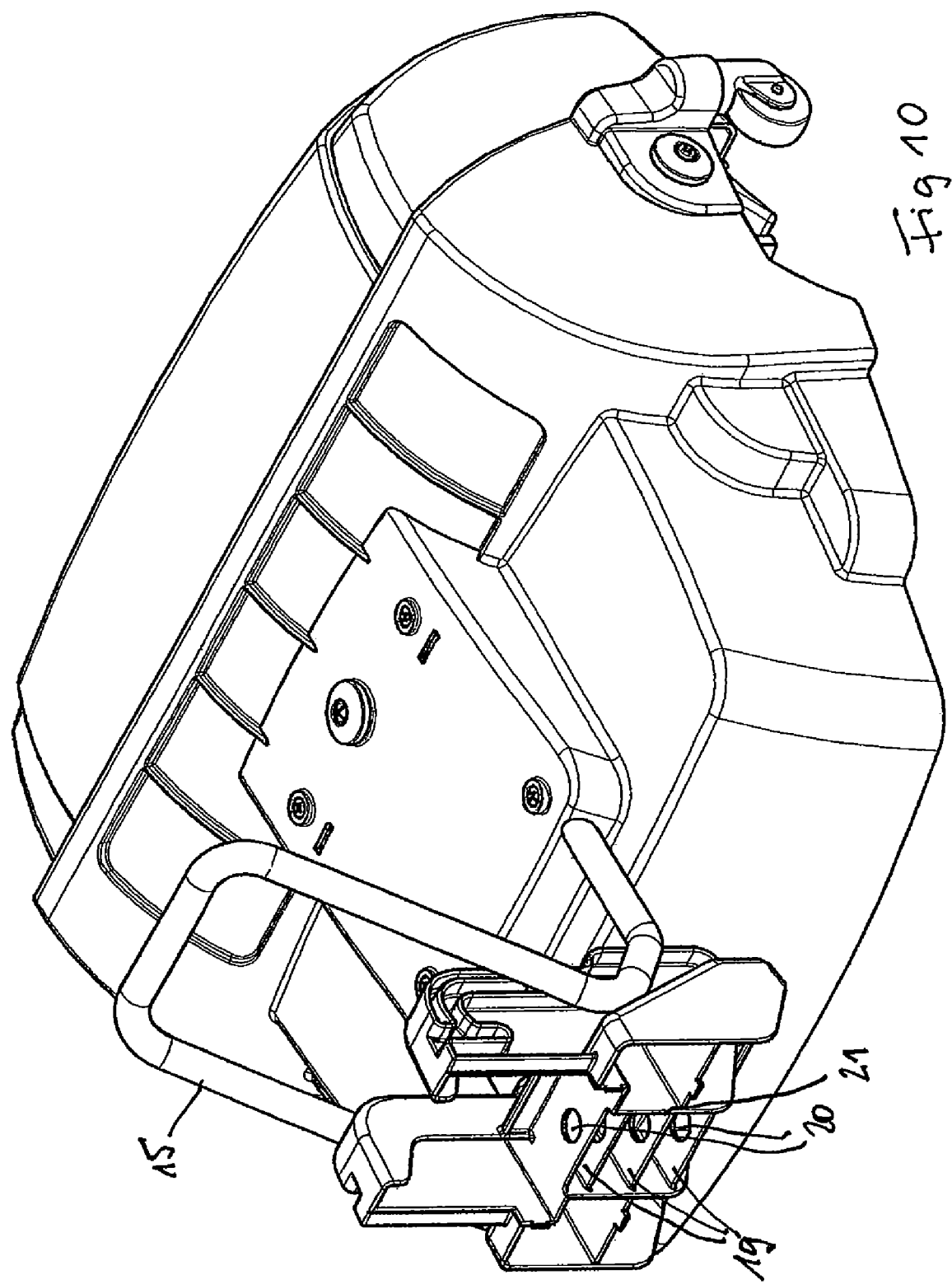

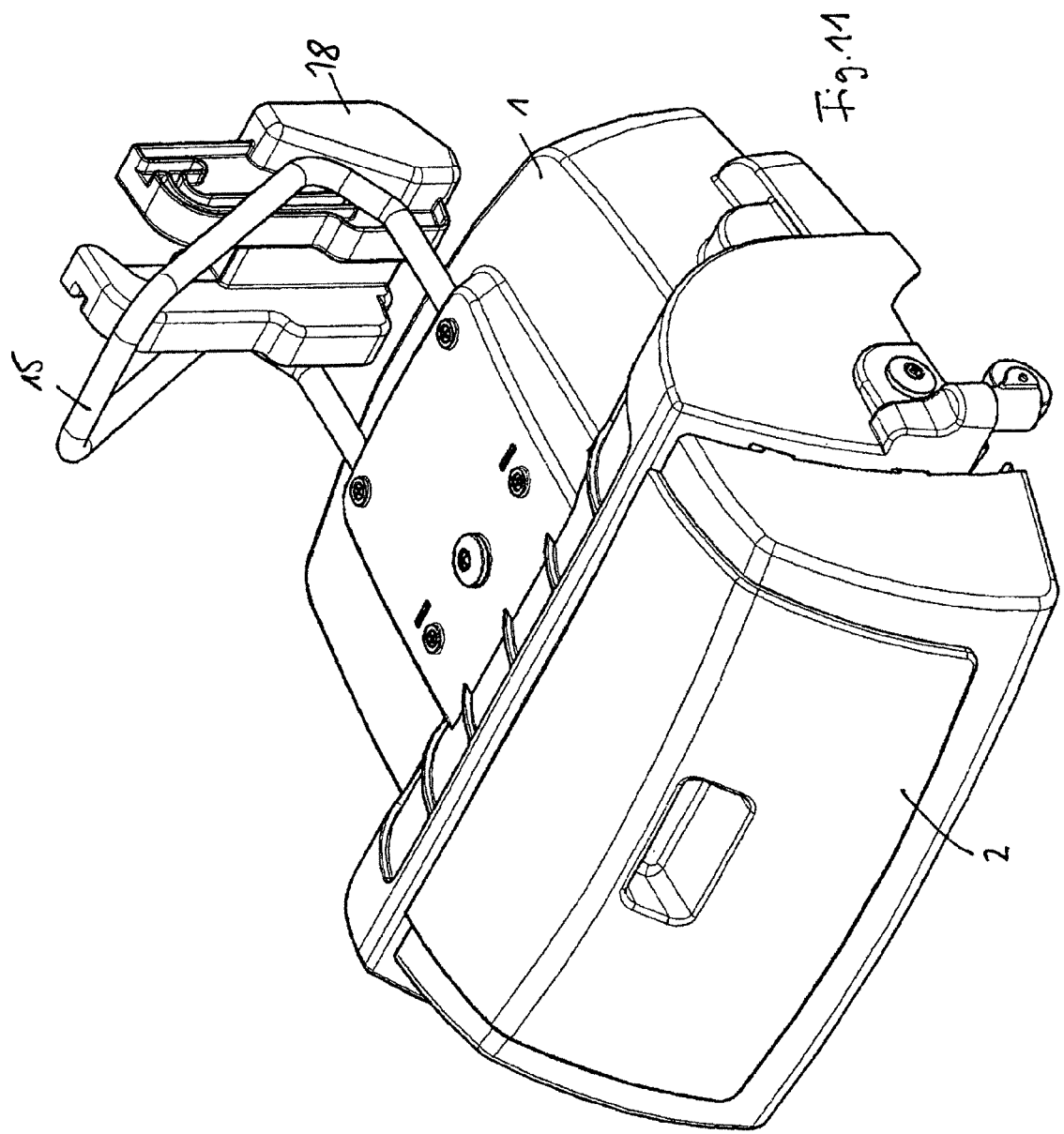

CHILDREN'S VEHICLE, PARTICULARLY PEDAL VEHICLE

The present invention relates to a children's vehicle, preferably a pedal vehicle although the invention is also applicable to motor-driven children's vehicles.

BACKGROUND OF THE INVENTION

Toy vehicles of the type in question, where a child is sitting on the pedal vehicle or a motor-driven vehicle, have an enhanced play value if equipped with accessories with which tasks or "operations" can be carried out in a playful way apart from the vehicle driving proper. An example of this is a pedal vehicle for children with a bucket held on two arms, which in a lowered position can for instance be loaded with sand to be subsequently pivoted upwards and locked in the lifted position, so that the pedal vehicle can now be moved with the load to its destination where the bucket is pivoted by means of a tilt mechanism and the sand load can be dumped. A further example is a pedal vehicle for children that is provided with a snow removal blade with which a child can inter alia remove snow from a sidewalk in front of an entrance door or from a passage to the garage, whereby driving with the pedal vehicle in snow is interesting.

The toy street cleaning device of DE 81 02 981 U1 comprises two running wheels in front of the brush roller in the direction of travel, wherein the running wheels are supported in longitudinal slots of the housing and, during movement of the device, get into frictional contact with longitudinal grooves on outer corrugated sections of the rotatable brush with their rubber rings arranged on the circumference, whereby the brush shaft is entrained and the brushes are thus put into rotation. These running wheels are not pivotably supported about vertical axles, so that during cornering they can slide over ground and will then no longer drive the brush roller.

In a toy sweeper carriage according to DE 873 669 the two rear wheels drive a brush roller through a gearing. A brush drive by means of running wheels of toy sweeper carriages is also disclosed in DE 874 261 B and U.S. Pat. No. 4,917,648 A.

SUMMARY OF THE INVENTION

It is the object of the present invention to indicate a children's vehicle the play value of which is increased in that it can be used for novel applications.

According to the invention this object is achieved by a children's vehicle particularly pedal vehicle, comprising a sweeping device provided with at least one brush roller which is rotatable about a horizontal axis and which is detachably connectable to the children's vehicle, characterized in that for driving the brush roller a driver wheel is arranged, which in the operative position of the sweeping device is positioned on the ground and is drivingly coupled with a drive axle which in turn is drivingly coupled with the axle of the brush roller, and that the driver wheel is rotatably supported about a vertical axle which is centrally arranged above the drive axle.

Further advantageous developments are disclosed and claimed below.

According to the invention the children's vehicle is connectable to a sweeping device that is provided with at least one brush roller. The sweeping device is here detachably connected to the children's vehicle, so that in case of need the sweeping device can be easily mounted on the children's vehicle and detached again.

Due to the mounting of the sweeping device the play value of the children's vehicle is considerably increased because the child is thereby enabled to perform an interesting and very often wholesome task in a playful way. For example, a child can sweep the floor in a flat with his/her vehicle or, outside the house, the child can free, for instance, the sidewalk in front of the entrance door or a passage to the garage from loose earth, sand, grit, or the like.

The sweeping device is preferably fastened at the front to the children's vehicle, to which end the children's vehicle may be provided with a projecting coupling mouth into which the sweeping device engages with a correspondingly designed attachment, said engagement being e.g. upheld by a bolt passed from the top to the bottom. It is within the scope of the present invention that instead of this the sweeping device can also be mounted at the rear side on the children's vehicle.

Advantageously, the sweeping device is fastened to the children's vehicle such that it is non-pivotable in the horizontal plane in relation to the children's vehicle. This means that the children's vehicle and the sweeping device form an elongated rigid unit, so that during cornering the sweeping device travels along the curved path together with the children's vehicle.

It is suggested with particular advantage that the sweeping device is connectable via an adapter to the children's vehicle, the adapter being preferably fastened to the above-mentioned coupling mouth of the children's vehicle. In this instance, too, the detachable mounting is preferably provided at the front on the children's vehicle, without the invention being limited to this.

The adapter has the function that the sweeping device is liftable out of the operative position, in which it rests with its rolls or wheels on the ground, with the whole sweeping device being lifted obliquely upwards. The adapter comprises guideways engaged by pegs that are positioned on a bracket which is rigidly fastened to the housing of the sweeping device. When the sweeping device is lifted, the pegs of the bracket are moved upwards in the guideways and are locked in the upper end position in which the sweeping device is lifted from the ground.

As has already been mentioned above, the sweeping device comprises at least one brush roller which is rotated about a horizontal axle extending in the transverse direction of the sweeping device. It is within the scope of the invention that for example also two brushes may be provided that are counter-rotating about vertical axles while positioned side by side in transverse direction.

According to the invention the drive mechanism contains a driver wheel which in the operative position of the sweeping device rests on the ground and is thus rotated during travel of the children's vehicle. The driver wheel has positioned thereon in one embodiment a further wheel which preferably has the shape of a spherical section and is permanently pressed with its crowned running surface against the driver wheel. This wheel that is driven by the driver wheel and could also be called ball wheel is connected to a drive axle for the brush roller for rotation therewith. The drive axle and the axle of the brush roller are drivingly connected e.g. via a link chain that is in engagement with the two gear wheels of the drive axle and the axle of the brush roller. Other means may also be used for transmitting the rotation of the drive axle to the axle of the brush roller, e.g. toothed belts, O-rings, or a toothed gearing.

The ball wheel is preferably equipped with a running surface of a high frictional coefficient and is e.g. made of EVA. The ball wheel or the driver wheel may have a surface structure that is helpful in transmitting the rotation of the driver wheel without sliding to the ball wheel.

Furthermore, it is intended according to the invention that the driver wheel is rotatably supported about a vertical axle. The vertical axle is here centrally positioned above the drive axle in that it is fastened at said place to the housing wall. This design has the consequence that upon steering movements of the children's vehicle the driver wheel is steered accordingly, the contact with the preferably arranged ball wheel of the drive axle being maintained all the time. This prevents a situation where during cornering of the vehicle with the sweeping machine the driver wheel only slides over the ground and does not drive the brush roller any more.

Moreover, the sweeping device preferably contains a collection bin which (with the preferred mounting of the sweeping device at the front end of the children's vehicle) is detachably fastened to the front end portion of the housing of the sweeping device. The brush roller is rotating on the ground in the direction of travel of the children's vehicle and of the sweeping device, thereby conveying the sweepings forwards into the collection bin.

According to a further proposal of the invention the front end portion of the housing of the sweeping device has fastened thereto two laterally spaced-apart castors that are rotatable about vertical axles. Thus the housing of the sweeping device is positioned on said front guide rolls and on the driver wheel arranged in the rear portion of the sweeping device, with the distance of the brush roller from the ground remaining constant all the time in the operative position of the sweeping device owing to this three-point bearing.

The housing of the sweeping device and its collection bin are expediently made from plastics, which is also true for the preferably provided adapter.

BRIEF DESCRIPTION OF THE DRAWINGS

Further details of the invention become apparent from the following description of a preferred embodiment of the sweeping device and with reference to the drawings, in which:

FIG. 1 is a side view of an embodiment of the sweeping device with an adapter;

FIG. 2 is a front view of the sweeping device according to FIG. 1;

FIG. 3 is a perspective top view on the sweeping device according to FIG. 1;

FIG. 4 is a section taken along line A-A in FIG. 2;

FIG. 5 is a side view of the drive arrangement for the brush roller of the sweeping device;

FIG. 6 is a section taken along line B-B in FIG. 5;

FIG. 7 is a front view on the arrangement according to FIG. 5 from the right side;

FIG. 8 is a top view on the arrangement according to FIG. 5;

FIG. 9 is a perspective view of the arrangement according to FIG. 5;

FIGS. 9 to 13 are various perspective views of the sweeping device according to FIG. 1.

DETAILED DESCRIPTION OF A PREFERRED EMBODIMENT

Figure 12:
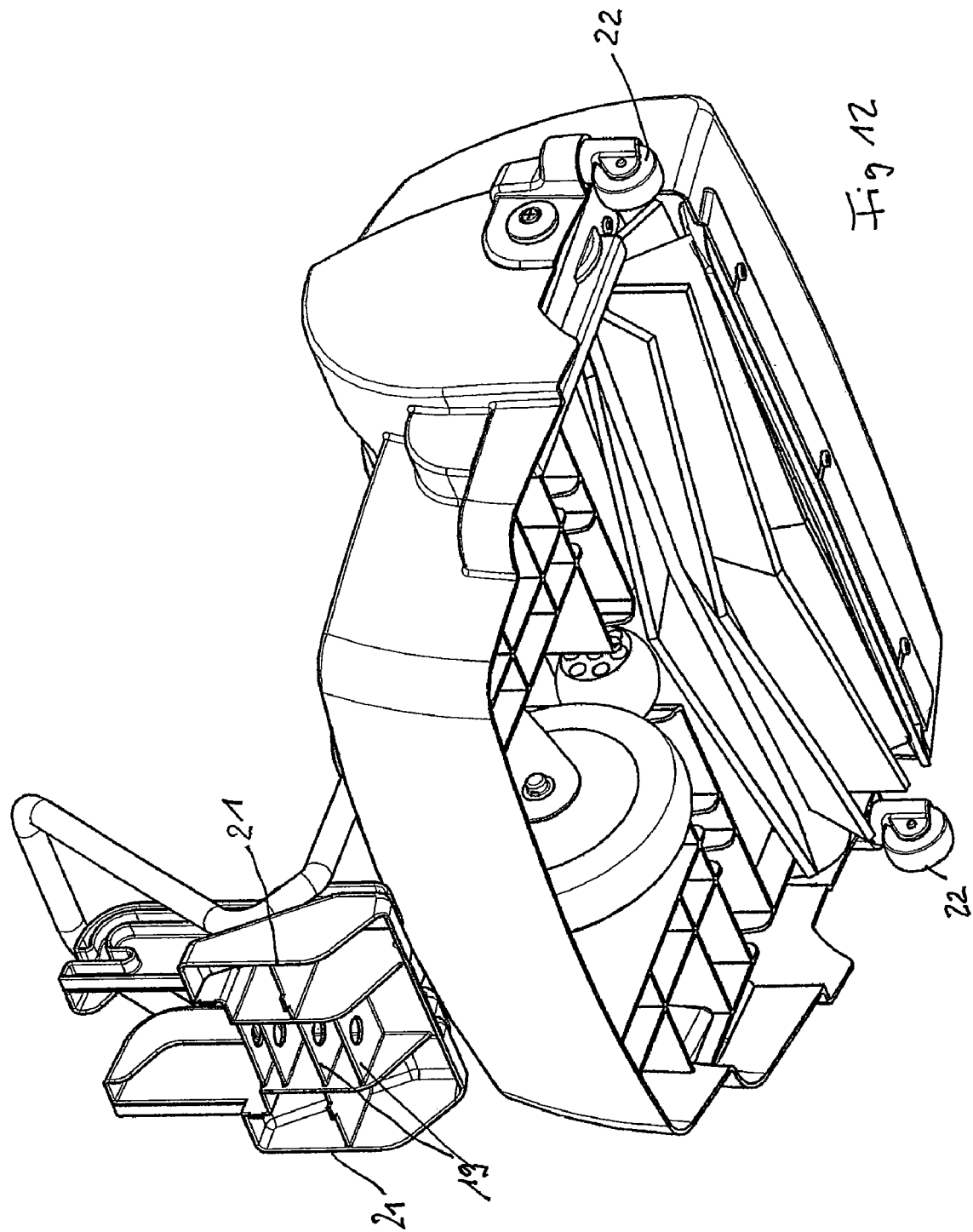
Figure 13:
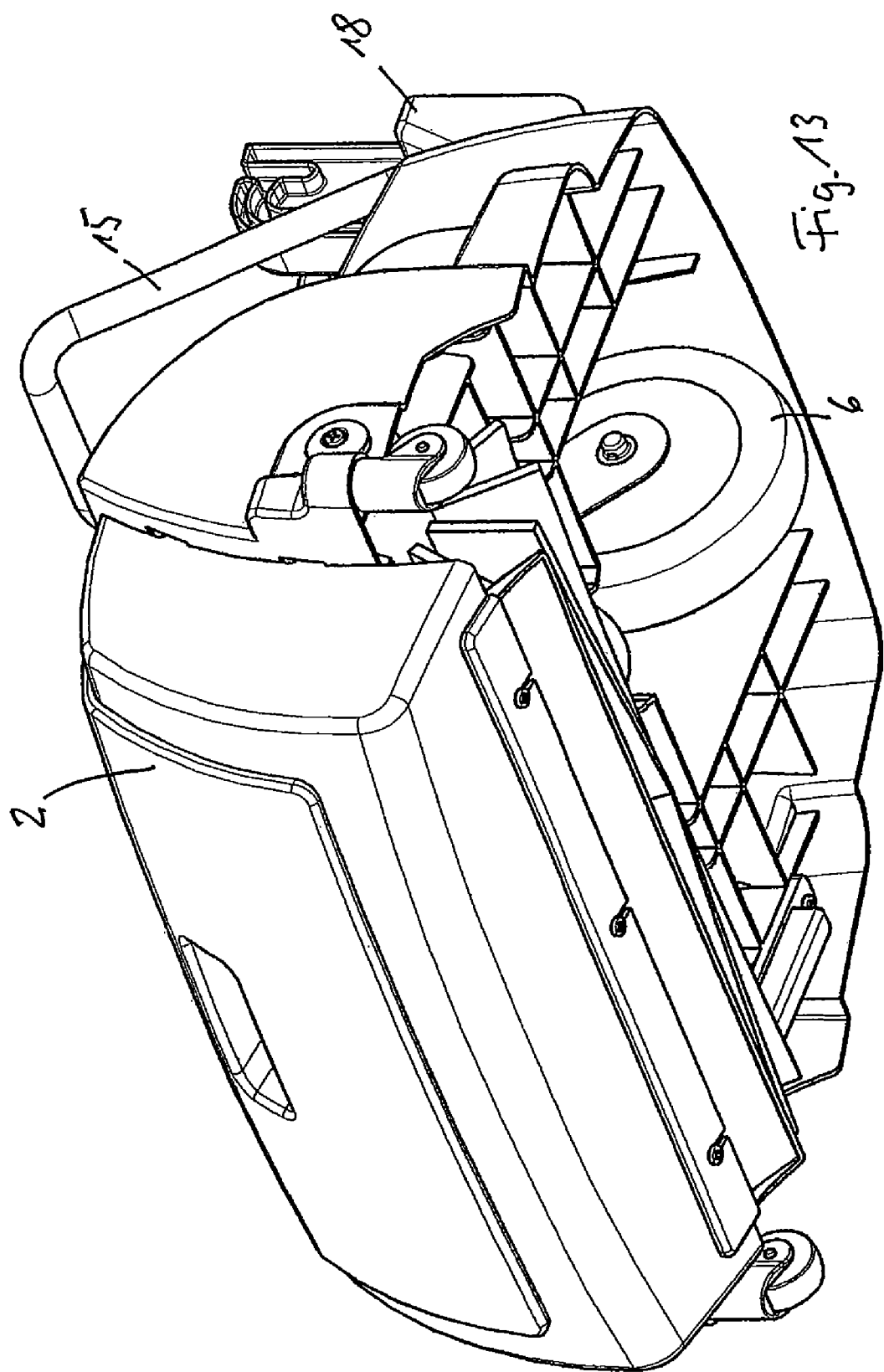
Figure 14:
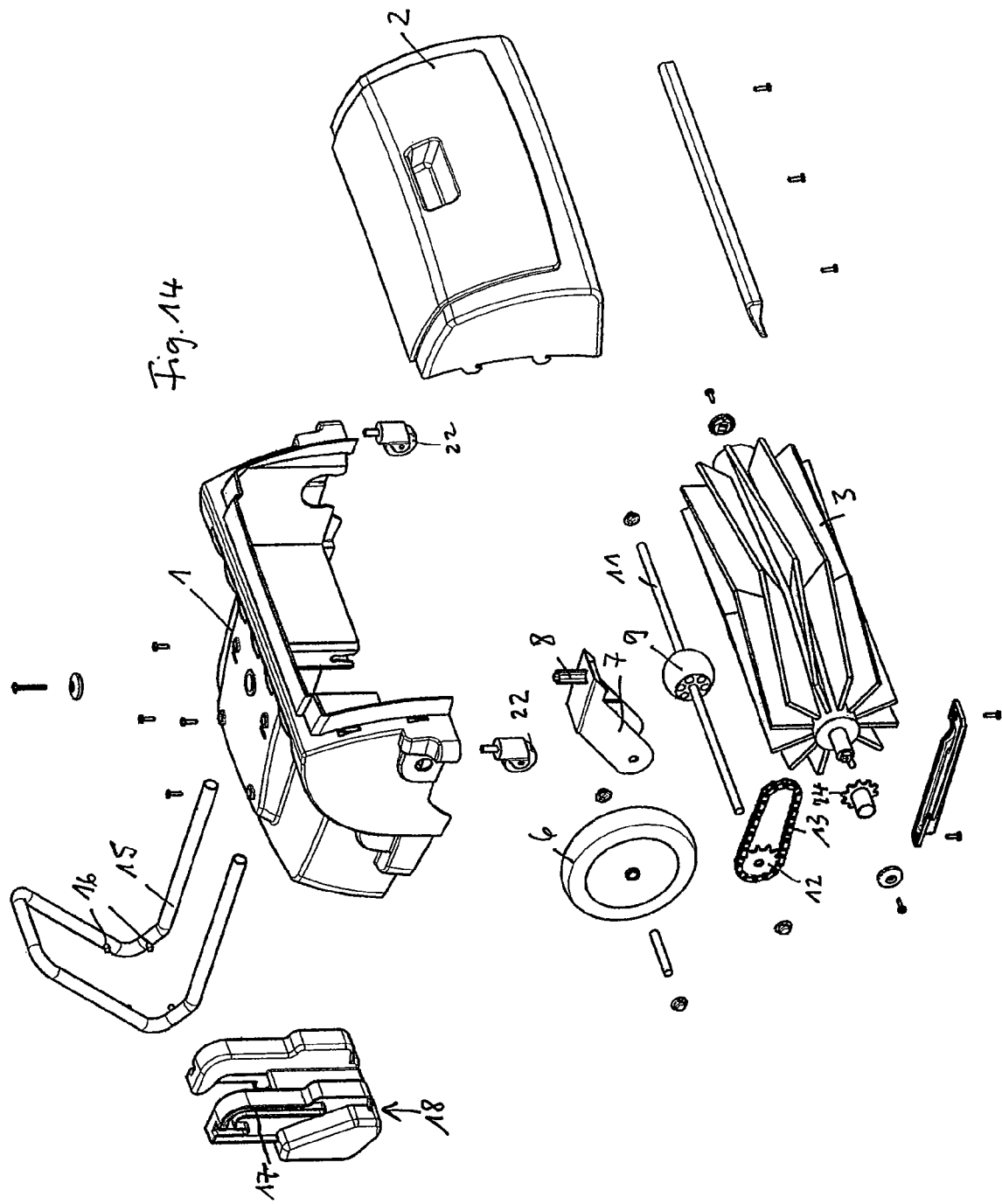
FIG. 14 is an illustration of the individual components of the sweeping device according to FIG. 1.

The sweeping device contains a housing 1, to the front end portion of which a collection bin 2 for sweepings is detachably fastened. Inside the housing 1, a brush roller 3 is arranged, which during forward travel of a vehicle for children (not shown in the figures) transports sweepings into the collection bin 2. The brush roller 3 is here rotating on the ground in the direction of travel of the children's vehicle, thereby conveying the sweepings forwards, and a lip 4 which extends in the longitudinal direction of the brush roller 3 and is positioned on the ground facilitates the entry of the sweepings into the collection bin 2.

To drive the brush roller 3, which is rotatable about its horizontal axle 5, a driver wheel 6 is arranged in the housing 1, with the driver wheel resting on the ground in the operative state of the sweeping device. The driver wheel 6 is connected via a mounting 7 to a pin 8 which forms a vertical axle about which the driver wheel 6 is pivotable. The pin 8 is fastened at the top to the housing 1 of the sweeping device.

A further wheel 9 is permanently resting on the driver wheel 6, said wheel 9 having a running surface 10 in the form of a circular arc when viewed in cross section. The wheel 9 is connected to a drive axle 11 for rotation therewith, with the wheel 9 being centrally seated on the drive axle 11.

At an end section of the drive axle 11 a gear wheel 12 is connected to the drive axle for rotation therewith, with a link chain 13 running thereover that other than that is in engagement with a gear wheel 14 of the axle 5 of the brush roller 3.

During forward movement of the sweeping device (to the right side in FIGS. 1 and 4) the driver wheel 6 is always rotated when the sweeping device is in the operative state in which the driver wheel 6 is positioned on the ground. During cornering the driver wheel 6 is pivoted about the vertical axle 8 that is positioned centrally above the driven wheel 9. The wheel 9 rotates the gear wheel 12 via the axle 11, whereby the brush roller 3 is put into rotation.

A bracket 15 which is rigidly connected to the housing 1 is fastened at the top to the housing 1. On the insides of the bars of the bracket 15 that are facing each other, inwardly projecting pegs 16 are positioned, which engage into guideways 17 of an adapter 18. The adapter 18 is fastened to a front coupling mouth (not shown in the figures) of a children's vehicle, the coupling mouth engaging between horizontal walls 19 (FIG. 10). The engagement is secured in that a bolt (also not shown) is passed through holes 20 of the walls 19 and of the coupling mouth, the holes being in alignment with one another.

With its front edge 21, which can be seen in FIG. 11, the adapter is positioned on the front end of the children's vehicle, so that the sweeping device is rigidly connected to the children's vehicle in the horizontal plane.

The sweeping device is liftable from its operative position shown e.g. in FIG. 1, in which it is positioned on the ground with the driver wheel 6 and two guide rolls 22 mounted on the front end of the housing 1, into an inoperative position in which the bracket 15 is used as a handle and lifted, the bracket being guided by means of its pegs 16 in the guideways 17 of the adapter 18. The upper pair of pegs is fixed in a locking section 23 of the guideways 17. In this state, the whole sweeping device is lifted from the ground.

Figure 15:
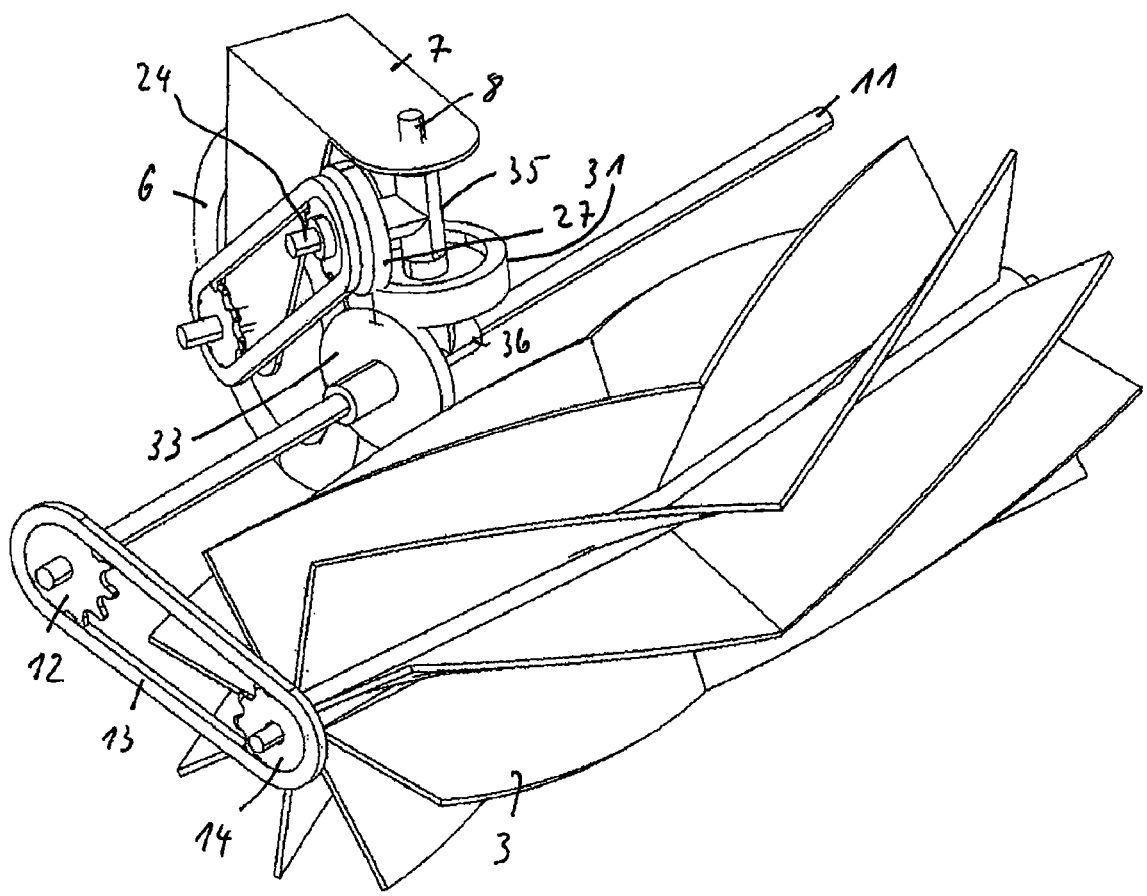
FIGS. 15 to 20 show an alternative drive by means of chain and gear wheels in various illustrations.
Figure 16:
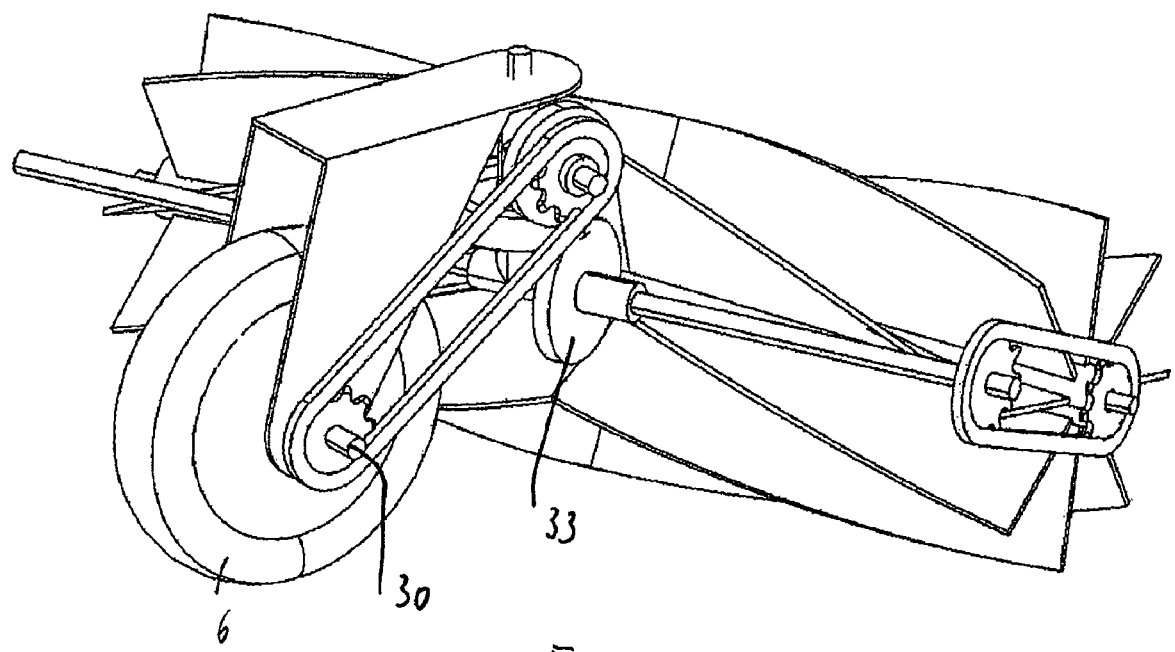
Figure 17:
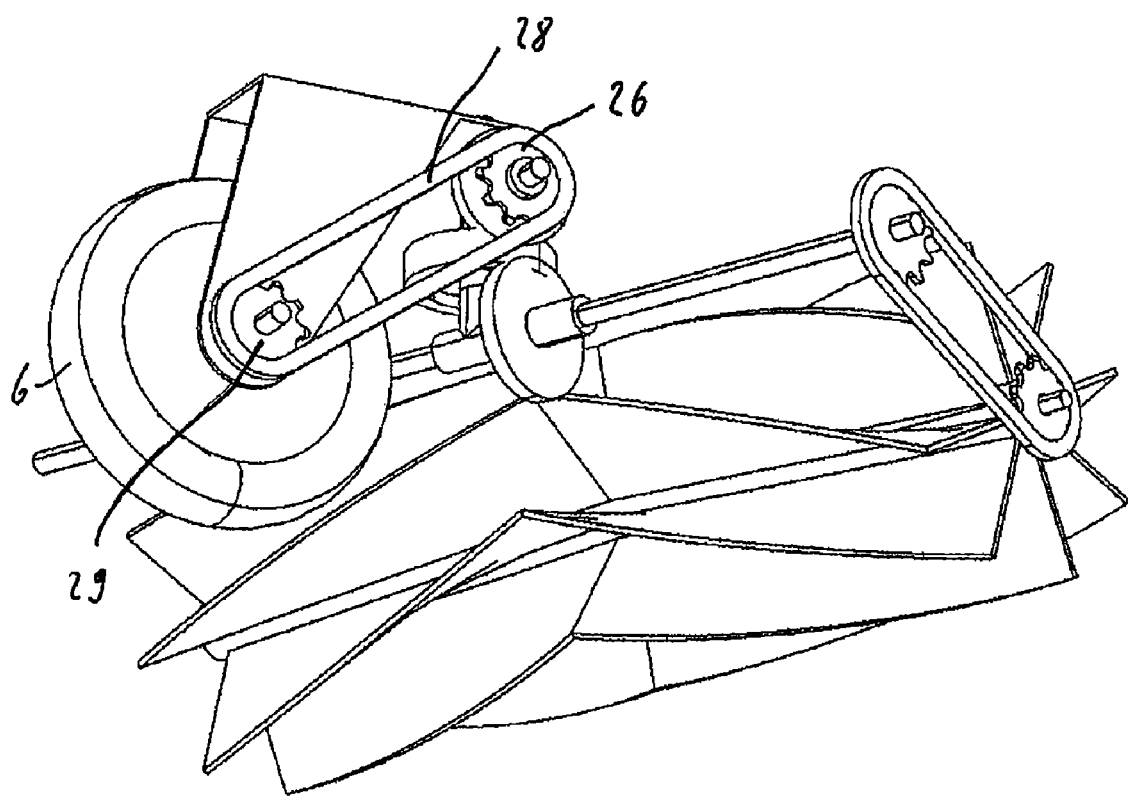
Figure 18:
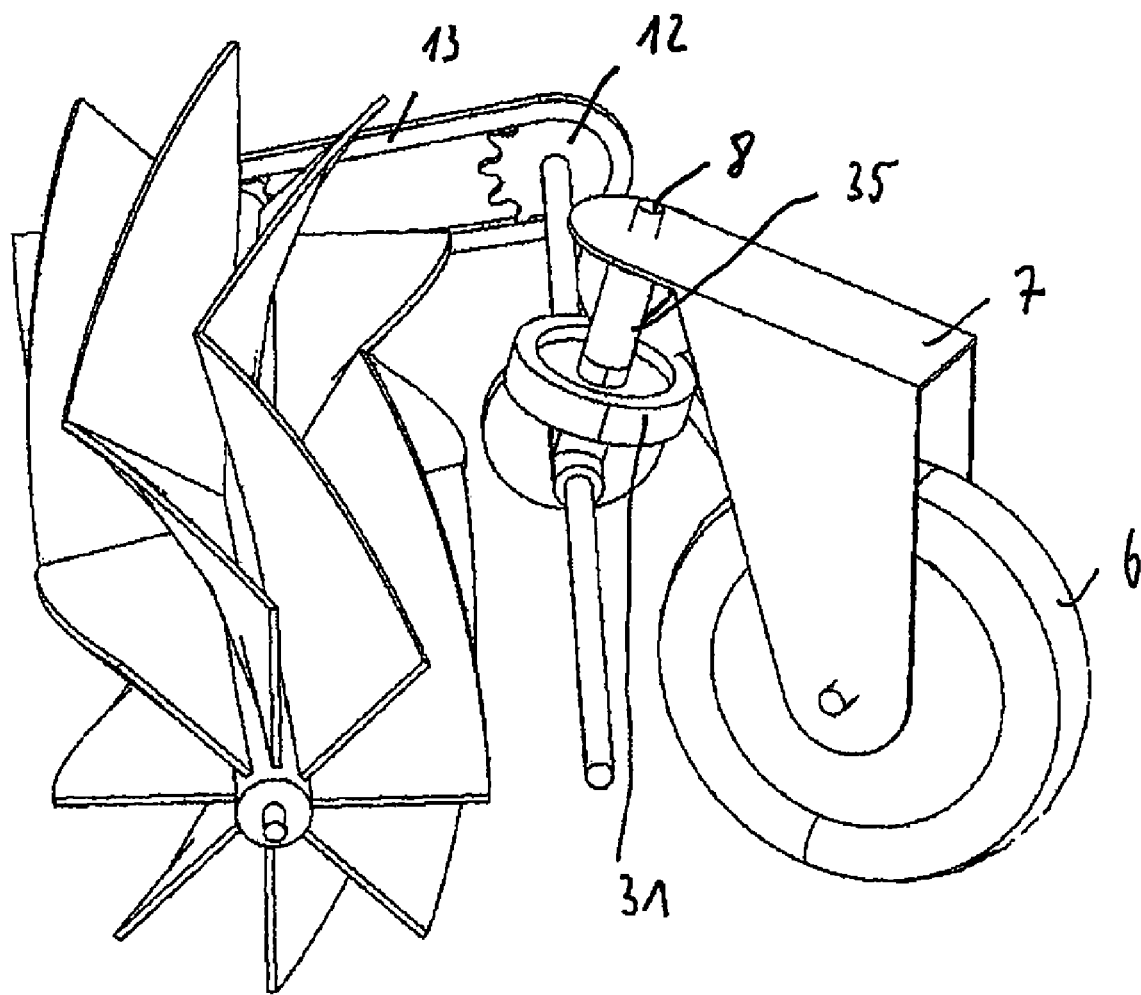
Figure 19:
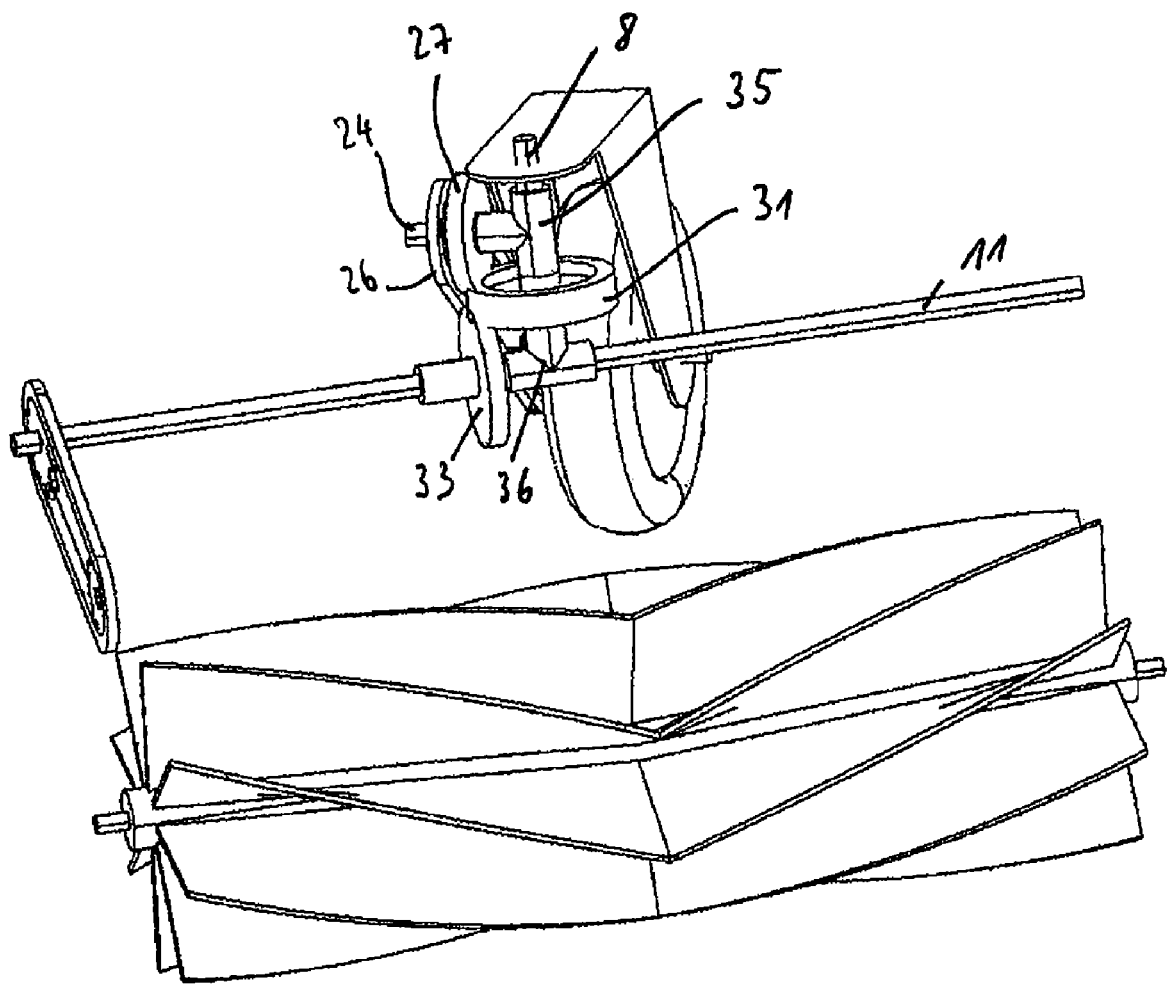
Figure 20:
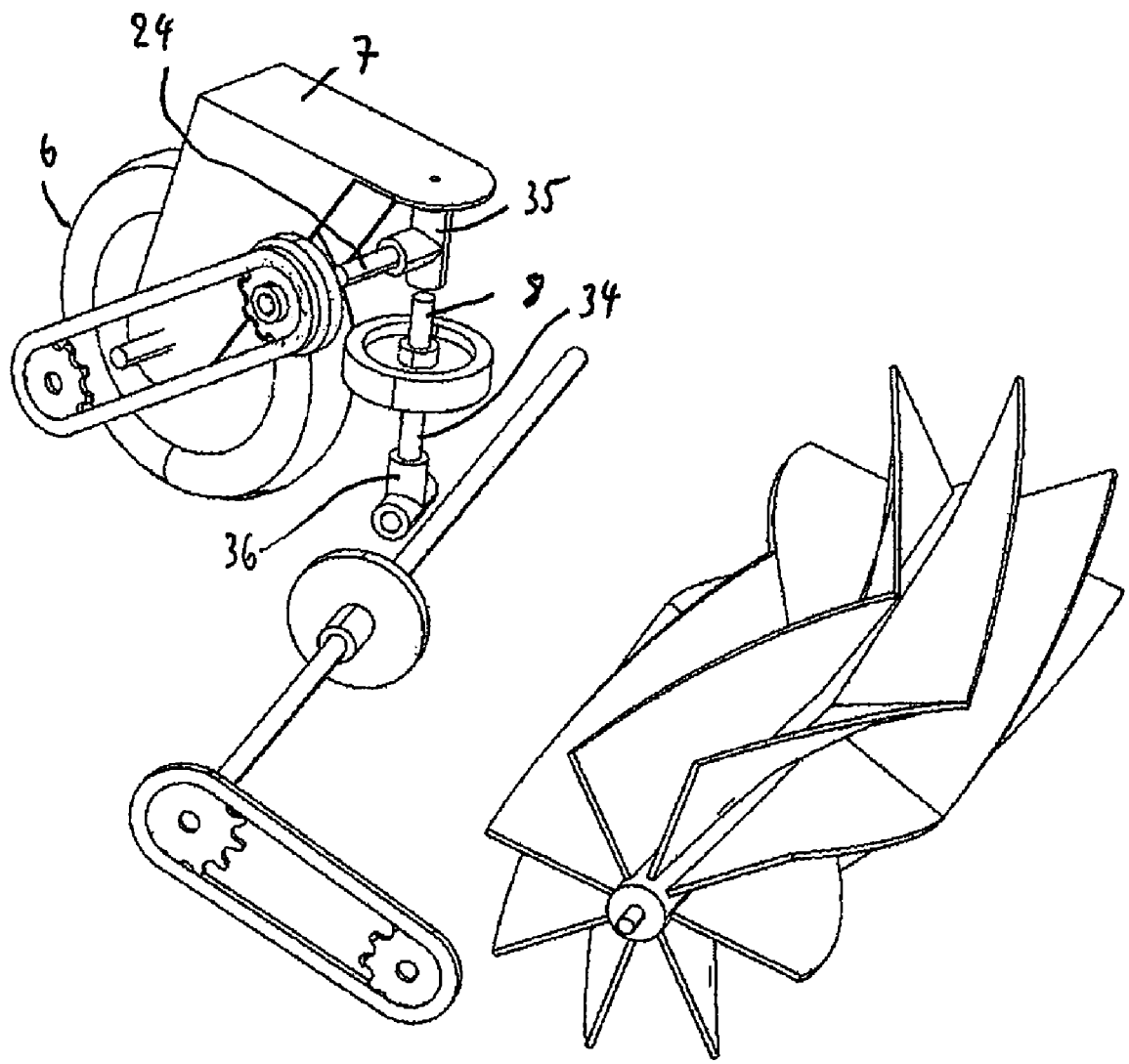

FIGS. 15 to 20 show an alternative drive for the brush roller of the sweeping device in different views. Like with the previous embodiment, the driver wheel 6 is rotatably fastened by means of a mounting 7 and an upper projection 8 to the housing 1. The projection 8 is the upper end section of an axle 34 which is passed through an upper T-shaped sleeve 35 and is seated with its lower end section in a lower T-shaped sleeve 36 through which the shaft 11 is rotatably running. An axle piece 24 on which a gear wheel 26 is rotatably seated that is secured for rotation with a gear wheel 27 arranged next thereto is inserted into the horizontal part of the sleeve 35. The gear wheel 26 is connected via a link chain 28 to a gear wheel 29 which is seated fixed for rotation on a shaft 30 driven by the driver wheel 6.

The gear wheel 27 is in engagement with a gear wheel 31 arranged at a right angle thereto, which is rotatably seated on the axle 34 and meshes with its lower toothed portion with a gear wheel 33 connected to the axle 11 for rotation therewith. Like with the above embodiment, the rotation of the axle 11 is transmitted via a gear wheel 12 connected for rotation therewith and via a link chain 13 to the gear wheel 14 to which the brush roller 3 is connected for rotation therewith.

Like in the above-described embodiment, the driver wheel 6 is pivoted with the mounting 7 about the axle 8 during cornering, the gear wheels 29, 26 and 27 with the link chain 28 following this pivotal movement. The gear wheel 27 is running on the gear wheel 31 accordingly. When the shaft 30 of the driver wheel 6 is rotated while the driver wheel 6 is running on the ground, the gear wheel 29 rotates the gear wheel 26 via the link chain 28 and thus the gear wheel 27, which via the intermediate wheel 31 rotates the gear wheel 33 and thus the gear wheel 12, which in turn makes the brush roller 3 rotate via the link chain 13.

I claim:

1. A children's vehicle, particularly pedal vehicle, comprising:
    a sweeping device provided with at least one brush roller which is rotatable about a horizontal axle and which is detachably connectable to the children's vehicle,
    a driver wheel arranged for driving the brush roller, wherein in the operative position of the sweeping device, the driver wheel is positioned on the ground and is drivingly coupled with a drive axle which in turn is drivingly coupled with the axle of the brush roller, and
    a second wheel having a running surface in the form of a circular arc connected to the drive axle for rotation therewith and rests on the driver wheel,
    wherein the driver wheel is rotatably supported about a vertical axle which is centrally arranged above the drive axle and the second wheel.

2. The children's vehicle according to claim 1, wherein the sweeping device is adapted to be fastened to a coupling mouth of the children's vehicle, the fastening being rigid in the horizontal plane.

3. The children's vehicle according to claim 2, wherein the coupling mouth is positioned at the front on the children's vehicle.

4. The children's vehicle according to claim 1, wherein the sweeping device is adapted to be fastened via an adapter to the children's vehicle.

5. The children's vehicle according to claim 1, wherein the sweeping device is liftable out of an operative position into a position spaced apart from the ground.

6. The children's vehicle according to claim 1, wherein the brush roller is drivingly coupled via a link chain engaging into gear wheels of the drive axle and the axle of the brush roller.

7. The children's vehicle according to claim 1, wherein the driver wheel is connected via gear wheels and a link chain to the drive axle.

8. The children's vehicle according to claim 7, wherein the vertical axle is retained by means of a sleeve on the drive axle.

9. The children's vehicle according to claim 1, further comprising
    a collection bin which is detachably fastened to the front end portion of the housing of the sweeping device.

10. The children's vehicle according to claim 1, further comprising two laterally spaced-apart guide rolls fastened to the front end portion of the housing.

* * * * *